(Model.)
H. LAURENCE.
DENTAL HAND PIECE.
No. 298,483. Patented May 13, 1884.
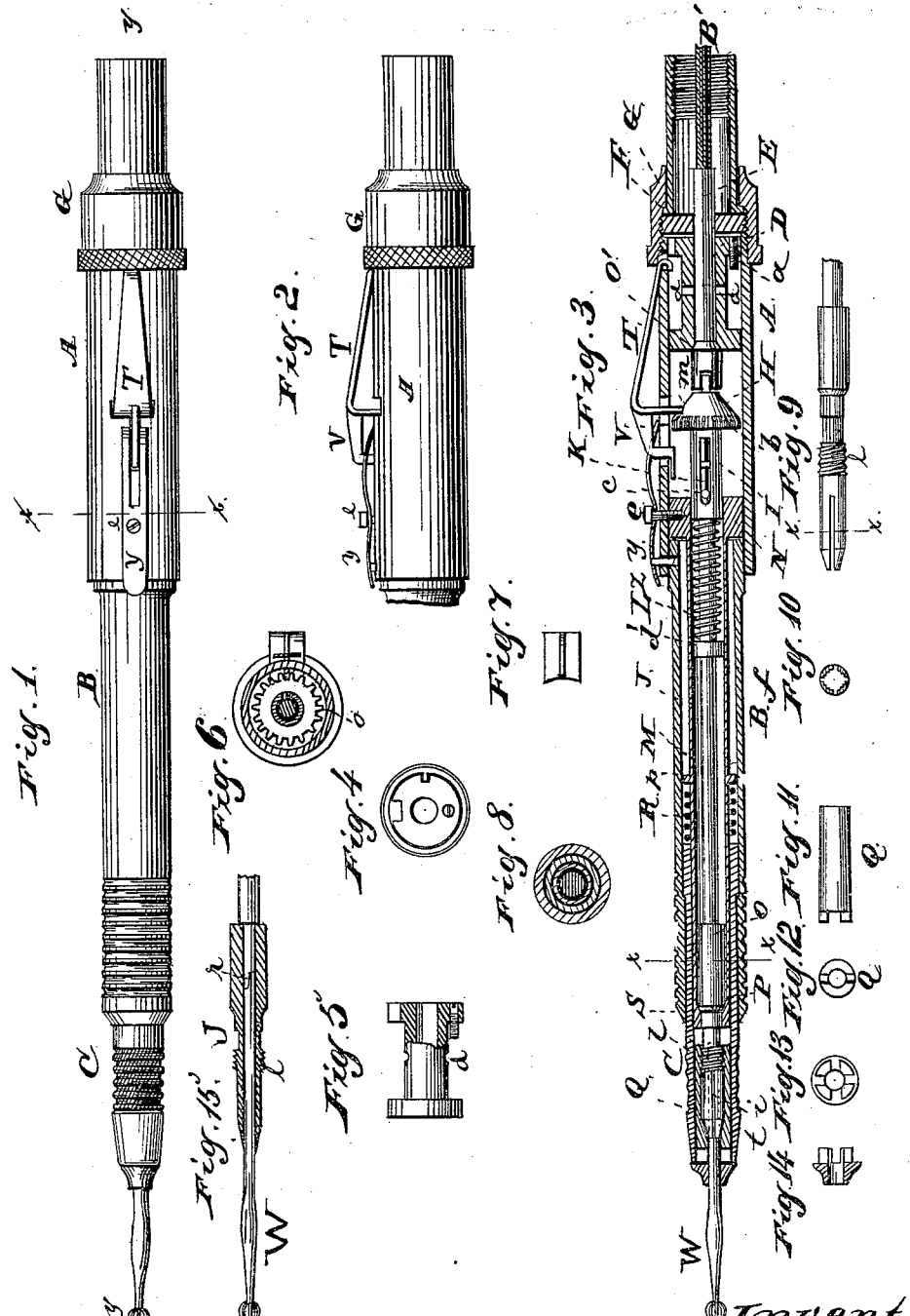
Witnesses:
J. P. McElroy
F. J. Griffen
Inventor:
H. Laurence
By J. A. Cowles
Atty

UNITED STATES PATENT OFFICE.

HENRY LAURENCE, OF CHICAGO, ILLINOIS.

DENTAL HAND-PIECE.

SPECIFICATION forming part of Letters Patent No. 298,483, dated May 13, 1884.

Application filed September 24, 1883. (Model.)

*To all whom it may concern:*

Be it known that I, HENRY LAURENCE, a citizen of the United States, residing at the city of Chicago, in the State of Illinois, have invented certain new and useful Improvements in Dental Hand-Pieces for Carrying Burr-Drills and other Tools in Operations on the Teeth, of which the following is the specification.

Figure 1 is a plan view. Fig. 2 is a side view of rear part of same. Fig. 3 is a longitudinal central section. Figs. 4 and 5 are details. Fig. 6 is a section of line $x\,x$ of Fig. 1. Fig. 7 is a detail showing end of lever. Fig. 8 is a section through line $t\,t$ of Fig. 3. Fig. 9 is a detail of chuck holding burr-drill or other tool. Fig. 10 is a cross-section of $x\,x$, Fig. 9. Fig. 11 is a view of screw-collar over split jaw end. Fig. 12 is an end view of Fig. 11. Fig. 13 is an end view of Fig. 14. Fig. 14 is a section of Fig. 13, being side view of end of tube through which passes burr or tool. Fig. 15 is a longitudinal section of front end of hollow spindle with tool in position, with shoulder on the rear end of tool and corresponding shoulder on inside of hollow spindle.

The nature and object of this invention is to provide a dental hand-piece for carrying burr-drills and other tools in operations on the teeth, or for other purposes, as will hereinafter be shown.

Similar letters of reference refer to similar parts in the different drawings.

A is the main sheath. B is the removable sheath, and C the telescopic sheath; and within these sheaths are the revolving parts of my hand-piece.

D is a bearing placed within the sheath A, in which works the shaft E, Fig. 3.

F is a head-piece placed within the screw-cap G, into which it fits in the form of a nut, as shown in Fig. 3, and through which the shaft E works. A superfluous portion of the bearing D is cut away between the ends, and is provided with the hole $d$, for oiling, leaving the ends to snugly fit within the sheath A.

$a$ is a set-screw working in end of bearing D and against head-piece F, to compensate any wearing away of the cone-bearings of the shaft.

H is a cone having at its base the teeth or cogs $b$. A cross-section of same is shown in Fig. 6. This toothed cone is attached to the sleeved shaft I. Within this sleeved shaft loosely works the spindle J.

$c$ is a pin fastened in the spindle-shaft J, and works in the slot K in sleeved shaft I.

L is a coiled spring on spindle J, and at one end works against the collar $d'$ on spindle J, and at the other end against the sleeved shaft I.

M is a tube, within which works the spindle J, having at its rear end the enlargement N, which snugly fits within the sheath A, and is fastened to the sheath A by means of the screw $e$. The collar $d'$ on spindle J serves as an abutment for spring L, and to steady spindle J in tube M. The spindle J, near its forward end, is enlarged to loosely work within the tube J, as shown at O, Fig. 3, and to form a conical shoulder, P, to work against the conical bearing S on the interior of tube M. This spindle J, at its forward end, is made tubular or hollow for the reception of the drill or tool, and the rear end of the tube is made with a shoulder, $r$, as shown in Fig. 15. This tubular or hollow end is slit into two or more jaws, as shown in Fig. 9. Fig. 10 is a cross-section of the same, and the inner surface of this hollow or tubular spindle is made serrated, as shown in Fig. 10, to enable it to more firmly grasp the tool. If desired, the tool may have a shoulder at its rear end to engage with the shoulder in the tube. (See Fig. 15.) The position of the tool W is shown by the dotted lines $t$, Fig. 3, and in Fig. 15. The slitted end of the hollow spindle J is made conical.

Q is a sleeve-collar having a screw cut on the interior at one end, and placed over the split end of spindle J, and fastened to it by being screwed onto the thread $l$ on the spindle J. The front end of the interior of this sleeve-collar is made conical to correspond with the conical form of the split end of spindle J, and as it is screwed up the ends of the spindle snugly embrace the tool and firmly hold it ready for work. The front end of the sleeve-collar Q is made in clutch form, as shown in Figs. 11 and 12. The telescopic sheath C, at its front end, is made with an opening, through which the tool passes into the jaws, and the interior of this end is made clutch form (see Figs. 13 and 14) to engage the end of screw-collar Q. Surrounding the tube M is the coiled spring R, which works between the collar $p$ and end of telescopic sheath $c$.

T is a lever, one end of which is hooked in form, and engages with main sheath or shell A through aperture at end of screw-cap G, and the other end turns downward, and passes through a hole in shell just over the cone H. From the bend of the lever starts the bayonet-arm V, with the blade of the bayonet passing through a slot in the shell, and resting on the inner surface of the shell.

Y is a spring, the rear end of which is split and straddles the arm V. The other end carries the pin Z. This pin passes down through the shell and into the removable shell B, and holds the two together. The spring Y is held in position by the screw $e$.

Motion is communicated to the revolving shaft E by means of the flexible cable B' or other means. This revolves the tool at the other end of hand-piece. To stop the motion of the tool, the lever T is depressed, when the end $m$ pushes the cone H forward and disengages the end of sleeved shaft I from the shaft E, and allows the shaft E to continue revolving, and holds the balance of the revolving parts from turning, when the tool can be removed. The coiled spring L, acting against the sleeved shaft I, causes it to close with the clutch end of shaft E. The arm V, when the lever T is depressed, engages with the teeth or cogs on base of cone H and holds it from revolving or rotating.

To remove a tool and replace it by another, the revolving of the spindle J is prevented by the depressed arm V; the telescopic shell C is shoved within the removable shell B, which causes the clutched end of the screw-collar Q to engage with the inner clutched or keyed forward end of the telescopic shell C, when the screw-collar Q is unscrewed, which loosens the drill or tool, when it is readily removed. The conical shoulders of shafts J and E work against conical bearings P and O'. This form of bearing insures a complete central motion of these shafts, and any wearing away between these two points is taken up by the set-screw $a$. The coiled spring L causes the clutched ends of shafts I and E to engage each other.

I claim—

1. The combination of the shaft E, sleeved shaft I, spindle J, made hollow at one end and provided with serrated jaws, and sleeved collar Q, as constructed and arranged for the purpose of holding the tool and communicating motion to it.

2. The combination of the sleeved shaft I, provided with toothed cone H, and lever T, provided with bayonet-arm V, for the purpose of disengaging the sleeved shaft I, with its clutched end, from the clutched end of shaft E, and holding the sleeved shaft I and spindle J from revolving, as and for the purpose shown.

3. A dental hand-piece having the shell—within which are the revolving parts—made of the screw-cap G, main shell A, removable shell B, and telescopic shell C, all constructed and arranged substantially in the manner and form shown.

4. The set-screw $a$, in combination with bearing D, and shaft E, and head-piece F, as and for the purpose shown.

HENRY LAURENCE.

Witnesses:
 J. P. McELROY,
 F. J. GRIFFEN.